United States Patent [19]
Du Preez

[11] 3,713,677
[45] Jan. 30, 1973

[54] TUBING CLAMPS

[76] Inventor: Jan Frederick Du Preez, 4 Saul Solomon Street, Vanderbijlpark, South Africa

[22] Filed: Feb. 4, 1971

[21] Appl. No.: 112,566

[52] U.S. Cl..............................287/54 C, 287/124
[51] Int. Cl...............................................F16b 7/00
[58] Field of Search......287/124, 2, 54 C, 54 A, 54 B

[56] References Cited

UNITED STATES PATENTS

| | | | |
|---|---|---|---|
| 3,278,209 | 10/1966 | Winikoff | 287/54 B |
| 1,404,522 | 1/1922 | Harris | 287/54 C |
| 2,496,032 | 1/1950 | Austin | 287/54 C |

FOREIGN PATENTS OR APPLICATIONS

| | | | |
|---|---|---|---|
| 677,108 | 8/1952 | Great Britain | 287/54 C |
| 215,903 | 11/1941 | Switzerland | 287/54 C |
| 540,858 | 11/1941 | Great Britain | 287/2 |

*Primary Examiner*—Andrew V. Kundrat
*Attorney*—Jacobi, Davidson, Lilling & Siegel

[57] ABSTRACT

The invention concerns a tubing clamp for clamping a piece of tubing to a fixed object, further pieces of tubing, and the like. The clamp comprises a first member adapted to fit across the end of the tubing, a second member adapted to be positioned within the tubing and having flanges which are expanded against the inside of the tubing by nuts and the like threaded on a bolt-like member passing from the first member through the second member. The bolt-like member may be part of a turnbuckle.

8 Claims, 5 Drawing Figures

1

TUBING CLAMPS

This invention relates to improvements in tubing clamps.

The present invention provides a tubing clamp, which comprises a first member adapted to fit across an end of the tubing, a second member adapted to be positioned within the tubing and having flanges adapted to be expanded against the inside of the tubing, a bolt-like member passing from the first member through the second member and having a means threaded thereon for forcing the flanges against the inside of the tubing.

The invention enables a piece of tubing to be clamped to a further object. The further object may be another piece of tubing, a fixed construction, or the like. The invention is suitable for scaffolding, tent frames, tubular frames for car ports, indoor or outdoor furniture, constructional toys, or the like. The pieces of tubing (hereinafter referred to as "tubes" for brevity) may, or may not, be of circular cross-section. The tubes may for example be of metal or a suitable plastics material. The invention can be used for making weight-supporting frames, or childs toys.

Conveniently the first member may have a shoulder portion adapted to fit against the end of the tube and a neck portion adapted to fit within the tube. The second member may have a concave outer surface any may comprise a waist and a skirt, the skirt being flanged.

The means for forcing the flanges against the inside of the tube preferably is a nut of frustoconical shape with the smaller end thereof facing the first member. The nut can be screwed into the threaded bolt-like member. The bolt-like member therefore does not have to have a typically shaped head but can be integral with the first member where this is convenient. For example, it may extend from the first member with its head fast within the first member, or can be completely separate and pass right through the first member as well.

To use the clamp, the second member is slid inside the tubes and the first member is placed against the end thereof. the means for forcing the flanges against the inside of the tubes is then screwed up the bolt-like member until it acts as a wedge and forces the flanges tightly against the inside of the tube. If desired, the second member may be integral with the first member.

If desired, means can be provided for clamping a further tube to the first member. In one embodiment of this type, a washer is provided on the bolt-like member, between the head thereof and the first member, said washer being adapted to retain the further tube between it and the first member. Preferably the first member and the washer both have concave or V-shaped depressions on the parts facing each other. The bolt like member can then pass through the washer, the further tube and the first member.

In another embodiment, the first member has a collar extending outwardly therefrom, and clamping means (e.g. bolts) are provided for clamping a further tube between the collar and a stop member. The bolts may pass, from the collar to the stopmember, on either side of (or even through) the further tube. If desired, in this embodiment, the stop member can be the first member of a further clamp according to the invention, said further clamp being reversed with respect to the first clamp. The first member may have the head of the bolt-like member sunk therein. Conveniently, the face of the first member adapted to receive the further tube may contain a concave or V-shaped depression.

In the embodiments described above for clamping a further tube, the first member may be so shaped that the further tube is adapted to be clamped at right angles, or at a smaller angle, to the first mentioned tube. A convenient way of effecting this is for the plane of the face of the first member, adapted to receive the second mentioned tube, to be at the desired angle (e.g. 45° or 90°) to the axis of the first mentioned tube.

In another embodiment the bolt-like member, together with one or more further bolt-like members, may be part of a turnbuckle.

For example, a central block can have a pair of bolt-like members extending therefrom in two opposite directions. If desired further bolt-like members can extend from the central block along other planes, which may be at 90° to the plane defined by the first pair of bolt-like members. Bolt-like members extending in opposite directions advantageously are oppositely threaded, i.e. one left hand and one right hand thread.

In one embodiment using a turnbuckle, a bolt-like member from the turnbuckle may pass through a first member adapted to fit across the end of a tube extending laterally of the bolt-like member and through a further first member adapted to fit across the end of a tube extending axially of the bolt like member. For example, the first member for use with the tube laterally of the bolt-like member may have a shoulder extending outwardly therefrom, with an aperture in the shoulder through which the bolt-like member may pass. The shoulder will be gripped against the central block of the turnbuckle on tightening up the nut on the bolt-like member.

The invention is further illustrated by reference to the accompanying drawings, in which.

Figure 1:
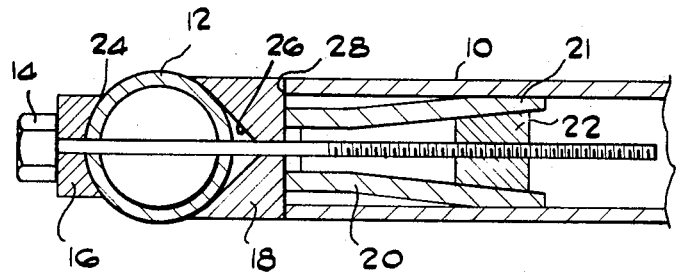
FIG. 1 is a cross-sectional view of one embodiment.

In FIG. 1 a first tube 10 is clamped to a second tube 12. The clamp comprises a bolt 14, passing in succession through washer 16, the second tube 12, a first member 18, a second member 20 with flanges 21 and a frusto-conical nut 22 which is threaded on the bolt 14. The washer 16 has a concave surface 24, and the first member 18 has a V-shaped depression 26 and shoulder 28.

Figure 2:
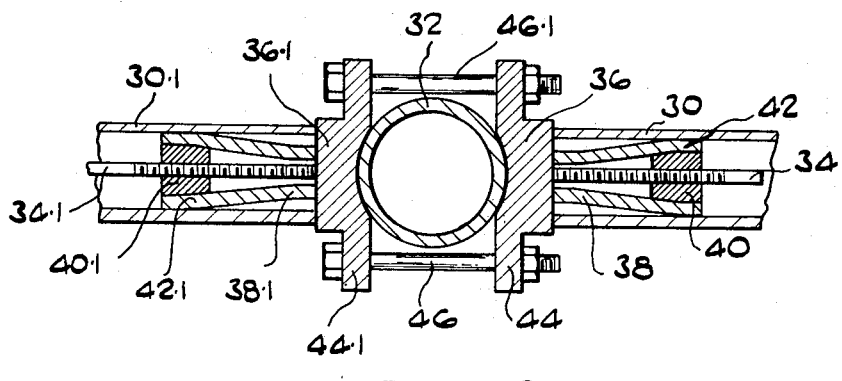
FIG. 2 is a cross-sectional view of a second embodiment.

In FIG. 2 a first tube 30 and second tube 30.1 are clamped to a third tube 32. Bolts are shown at 34, 34.1, first members at 36, 36.1 second members at 38, 38.1, frusto-conical nuts at 40, 40.1 and flanges at 42, 42.1. The two first members have collars 44, 44.1, through which bolts 46, 46.1 pass to clamp the two collars together with the tube 32 in between.

Figure 3:
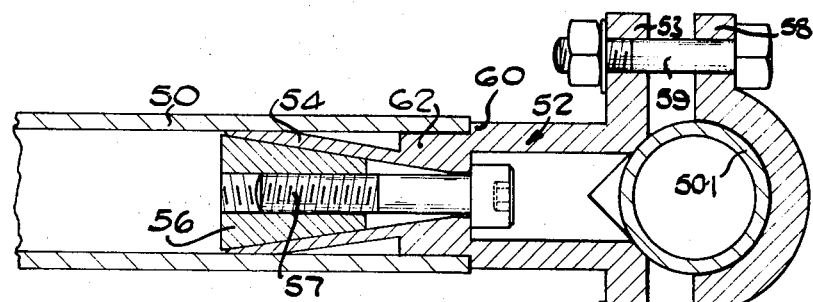
FIG. 3 is a cross-sectional view of a third embodiment.

In FIG. 3, tubes 50 and 50.1 are clamped together against first member 52 having collar 53. Flanges 54 of a second member are pressed against the inside of the tube 50 by nut 56 on bolt 57. A stop 58 grips the tube 50.1 against the first member 52 by bolts 59, 59.1 passing through the collar 53. The first member has a shoulder portion 60 and a neck portion 62.

Figure 4:
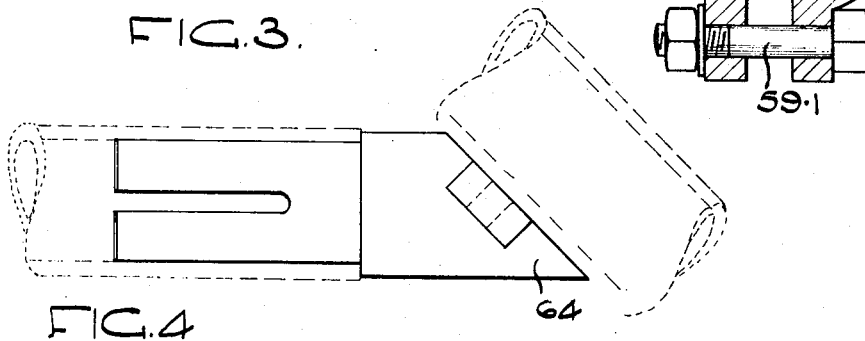
FIG. 4 is a side view of a modified first member.

FIG. 4 shows the shape of a first member 64 for enabling two tubes to be clamped at 45° to each other. The positions of the two tubes are shown in broken lines.

Figure 5:
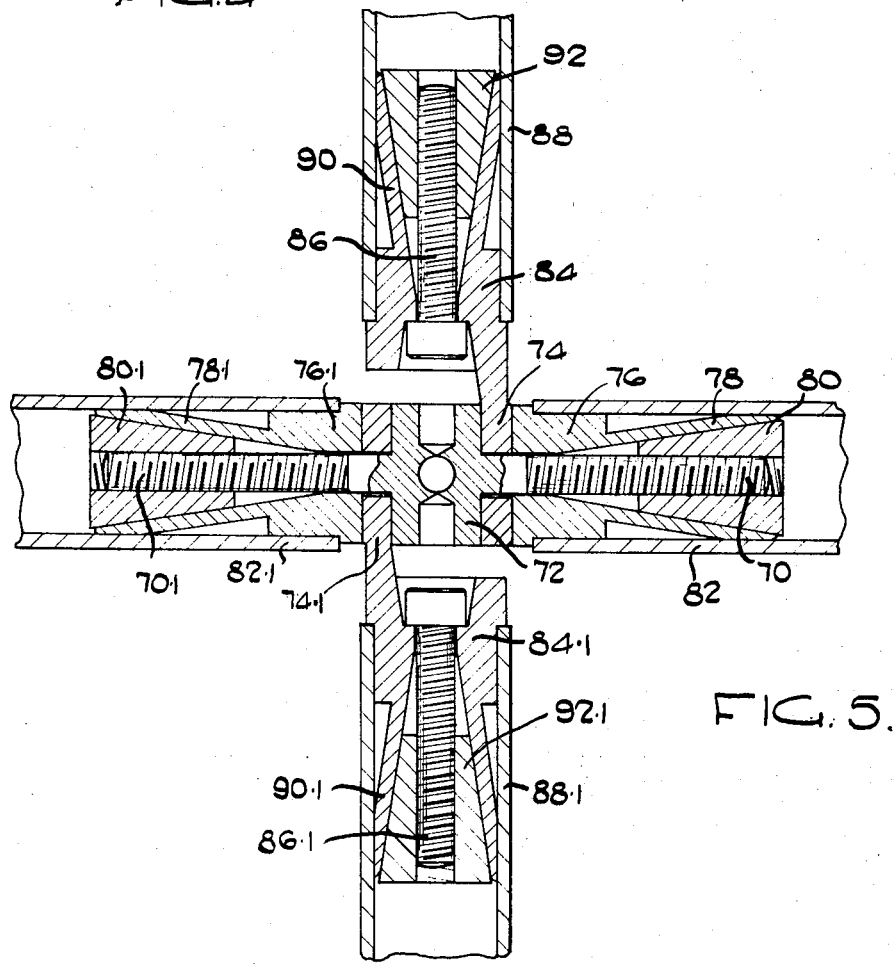
FIG. 5 is a cross-sectional view through a fourth embodiment.

In FIG. 5, two bolt-like members 70, 70.1 extend in opposite directions from the central block of a turnbuckle 72. The bolt-like members 70, 70.1, pass in turn through shoulders 74, 74.1, first members 76, 76.1 having integral second members 78, 78.1 before having frusto-conical nuts 80, 80.1 screwed on. The frusto-conical nuts 80, 80.1 cause the flanges of second members 78, 78.1 to expand against the inside of tubes 82, 82.1.

The shoulders 74, 74.1 are extensions of further first members 84, 84.1 having bolts 86, 86.1 therein at right angles to the bolt-like members 70, 70.1. The further first members 84, 84.1 abut against tubes 88, 88.1. Second members 90, 90.1 and frusto-conical nuts 92, 92.1 are positioned within the tubes 86, 86.1.

I claim:
1. A structural joint comprising a first length of hollow tubing, a first member fitting across one end of said length of hollow tubing, a second member positioned within the length of hollow tubing and having flanges expandable outwardly against the inside of the length of hollow tubing, bolt means passing from the first member through the second member, nut means threaded on bolt means and expanding the flanges of the second member outwardly into rigid gripping contact with the inside of the length of hollow tubing, a second length of hollow tubing positioned against the first member and extending across the end of the first member, a saddle positioned against the second length of hollow tubing on the side substantially diametrically opposed from the first member, and bolts connecting the saddle to the first member and straddling the second length of hollow tubing.

2. A structural joint according to claim 1, wherein the first member has a shoulder portion adapted to fit against the end of the tubing, and a neck portion adapted to fit within the end of the tubing.

3. A structural joint according to claim 2, wherein the first and second members are integral with one another.

4. A structural joint according to claim 3 wherein the bolt means passes freely through the first and second members.

5. A structural joint according to claim 1 wherein the bolt means is fast with the first member.

6. A structural joint according to claim 1, wherein the saddle has a bolt means extending outwardly thereform and passing into a third length of hollow tubing, a third member having outwardly expandable flanges being positioned on the bolt means within the third length of hollow tubing, and wherein nut means are threaded on the bolt means to expand the flanges of the thin member against the inside of the third length of hollow tubing.

7. A structural joint according to claim 4 wherein the second length of hollow tubing is positioned against the first member with its longitudinal axis at an angle of 90° to the longitudinal axis of the first length of hollow tubing.

8. A structural joint according to claim 4, wherein the second length of hollow tubing is positioned against the first member with its longitudinal axis at an angle of 45° to the longitudinal axis of the first length of hollow tubing.

* * * * *